US011350572B2

(12) United States Patent
Rosseel et al.

(10) Patent No.: US 11,350,572 B2
(45) Date of Patent: Jun. 7, 2022

(54) INTELLIGENT BALING

(71) Applicant: CNH Industrial America LLC, New Holland, PA (US)

(72) Inventors: Bram Rosseel, Snellegem (BE); Dieter Kindt, Vladslo (BE); Jeroen Devroe, Izegem (BE); Brecht Vermeulen, Kortrijk (BE); Thomas Debbaut, Ronsele (BE); Dries Liefooghe, Alveringem (BE)

(73) Assignee: CNH Industrial America LLC, New Holland, PA (US)

(*) Notice: Subject to any disclaimer, the term of this patent is extended or adjusted under 35 U.S.C. 154(b) by 235 days.

(21) Appl. No.: 16/403,222

(22) Filed: May 3, 2019

(65) Prior Publication Data

US 2019/0357442 A1 Nov. 28, 2019

(30) Foreign Application Priority Data

May 4, 2018 (BE) ............................... BE2018/5288

(51) Int. Cl.
*A01F 15/08* (2006.01)
*A01F 15/04* (2006.01)

(52) U.S. Cl.
CPC ........ *A01F 15/0825* (2013.01); *A01F 15/046* (2013.01)

(58) Field of Classification Search
CPC ...... A01F 15/08; A01F 15/0825; A01F 15/10; A01F 15/04; A01F 15/046; A01F 2015/102

USPC ........................................................ 100/179
See application file for complete search history.

(56) References Cited

U.S. PATENT DOCUMENTS

| 10,225,990 | B2 * | 3/2019 | Monbaliu .......... A01F 15/0825 |
| 10,338,088 | B2 * | 7/2019 | Verhaeghe ................ G01P 3/00 |
| 2011/0023437 | A1 * | 2/2011 | Kendrick ............ A01F 15/0825 56/341 |
| 2012/0240797 | A1 | 9/2012 | Verhaeghe et al. |
| 2013/0000497 | A1 * | 1/2013 | Posselius ................ A01F 15/08 100/40 |

(Continued)

FOREIGN PATENT DOCUMENTS

| EP | 2656726 A1 | 10/2013 |
| EP | 2779819 B1 | 5/2016 |

(Continued)

*Primary Examiner* — Adam J Eiseman
*Assistant Examiner* — Fred C Hammers
(74) *Attorney, Agent, or Firm* — Peter Zacharias; Patrick Sheldrake

(57) ABSTRACT

An agricultural baler including a baling chamber and a pre-compression chamber, the baling chamber including at least one movable wall. The agricultural baler further includes multiple sensors and a controller adapted for controlling operation of the agricultural baler based on inputs of the multiple sensors, wherein a first subset of the multiple sensors is related to a first feature and a second subset of the multiple sensors is related to a second feature. The controller is configured to control the operation of the agricultural baler in a first time period until the first feature is within a first predetermined range, and to control the operation of the agricultural baler in a subsequent time period, until the second feature is within a second predetermined range.

12 Claims, 2 Drawing Sheets

(56) References Cited

U.S. PATENT DOCUMENTS

| | | | |
|---|---|---|---|
| 2013/0008324 A1* | 1/2013 | Verhaeghe | A01F 15/0825 100/99 |
| 2014/0208708 A1* | 7/2014 | Waechter | A01F 15/0825 56/10.2 R |
| 2015/0373918 A1 | 12/2015 | Coen et al. | |
| 2016/0088800 A1 | 3/2016 | Lang et al. | |
| 2016/0120129 A1 | 5/2016 | Verhaeghe et al. | |
| 2016/0316634 A1 | 11/2016 | Naeyaert et al. | |
| 2017/0013782 A1* | 1/2017 | Kindt | A01F 15/0825 |
| 2018/0213724 A1* | 8/2018 | Debbaut | B30B 9/3007 |

FOREIGN PATENT DOCUMENTS

| | | |
|---|---|---|
| WO | 2011/039140 A1 | 4/2011 |
| WO | 2013/123990 A1 | 8/2013 |

* cited by examiner

INTELLIGENT BALING

FIELD OF THE INVENTION

The present invention relates to an agricultural baler. Desirably the present invention relates to a square agricultural baler, which is provided for gathering crop material, forming slices of crop material from the gathered crop material, and pressing square bales from the slices.

BACKGROUND OF THE INVENTION

Agricultural balers typically comprise two main parts used in the formation of the bales, being a pre-compression chamber and a baling chamber. Crop material is gathered and pushed into the pre-compression chamber, where a slice of crop material is formed. Pre-compression chamber is linked to the baling chamber in such a manner that the slice of crop material can periodically be transferred into the baling chamber. In the baling chamber, a plunger reciprocally moves, thereby pressing a square bale from subsequently fed slices.

The plunger movement is powered via a main shaft driven by a motor. Thereby, the motor can be a part of the baler, or can be a part of the puller (tractor) connected to the baler via a power take-off (PTO). In practice, this reciprocal movement of the plunger is often considered the most dominant movement in the baler, dominant meaning that other movements are made relative to this movement of the plunger. The reason is that the plunger movement requires the highest force (highest relative to other forces needed for operating the baler). Of all movements in the baler, the plunger movement shows the highest inertia.

The pre-compression chamber is adapted for receiving gathered crop material. To this end, the pre-compression chamber has an inlet. The pre-compression chamber furthermore includes an outlet towards the baling chamber. Between the inlet and the outlet, a channel is defined in which crop material can gather into a slice of crop material. The pre-compression chamber comprises a slice pushing mechanism, so-called stuffer, provided for pushing a slice of crop material formed in the pre-compression chamber through the outlet of the pre-compression chamber into the baling chamber. The sliced crop material is typically pushed in a first segment of the baling chamber. First segment is typically located directly behind the plunger (the plunger being in the withdrawn position). Thereby the slice of crop material is pushed in the baling chamber, after which the plunger can propel the crop material into the baling chamber, thereby pushing the most recently entered slice into the baling chamber, making it a part of the square bale which is being formed.

The pre-compression chamber comprises, for the purpose of pushing the slice into the baling chamber, a slice pushing mechanism. Different types of slice pushing mechanisms are known, among which fingers grasping behind the slice and pushing the slice through the outlet, or a set of conveyer belts in between which the slice is formed, and which conveyer belts are driven to push the slice through the outlet.

The slice pushing mechanism is driven via a driving mechanism that is operationally linked to the plunger driving mechanism. A synchronized movement between the slice pushing mechanism and the plunger is needed to ensure a proper operation of the baler. Namely, only when the plunger is withdrawn, a slice can be pushed in the baling chamber. In practice, different synchronization types are possible among which a one/one synchronization, meaning that every withdrawal of the plunger a new slice is entered into the baling chamber, or a one/two synchronization, meaning that every other withdrawal of the plunger a new slice is entered, thus the plunger moves forth and back two times for each slice. Other synchronization timing such as one/three, one/four, . . . are also possible.

Synchronization is in practice often realized by mechanically linking the plunger driving mechanism and the slice pushing driving mechanism. Such mechanical link ensures proper synchronization, as the slice pushing mechanism is mechanically driven by the plunger movement, it cannot move out of synchronization. The synchronization can be variable using known techniques so that the timing can be adapted, while still having a connection between the plunger driving mechanism and the slice pushing driving mechanism.

In practice, there is an inverse relationship between the quantity of bale material to be compressed on each compression stroke of the plunger and the maximum level of compression of the bale material and the density of the bale. If a large quantity of material is fed into the bale chamber this will result in a large slice thickness and a low level of compression, and therefore a low density. On the other hand, if a small quantity of bale material is fed into the bale chamber on each stroke this will result in a small wad thickness and a high maximum level of compression, and therefore a high density. As the throughput of the baling machine (that is, the rate in kg/hour at which material is compressed) depends on the amount of bale material compressed per stroke of the plunger, there is also an inverse relationship between the throughput of the baler and the density of the bale. The operator therefore has to choose either a high throughput and a low density, or a low throughput and a high density.

Another drawback in the operation of the known balers relates to so called top fill and so called left-right fill. Top fill and left-right fill are a measure for the uniformity of the slice after it has entered the first segment of the baling chamber. It will be recognized that a non uniform fill, for example where the lower part of the first segment is more dense than an upper part, or the left part of the first segment is more dense than the right part, results in an inferior bale. Such top fill has an effect that a bale is high dense at lower end, and not dense at the top, resulting in a unstable bale that is likely to show a substantial deviation from the ideal square form. A negative top fill also results in a substantial wear of the plunger and baling chamber, as forces are not equally transmitted. The plunger will feel a substantially high resistance at the lower part of the plunger compared to the upper part resistance of the plunger. This will create a torque force exerted to the plunger which has to be borne by the plunger driving mechanism. When the ideal top fill can be obtained, a bale can be formed with nearly ideal outer dimensions and shape, and excessive wear on the baler mechanism can be avoided.

It is an object of the invention to mitigate at least one of the aforesaid problems. In particular, it is an object of the invention to provide a baler where different features are controllable in a more accurate manner.

SUMMARY OF THE INVENTION

To this end, the invention provides an agricultural baler comprising a baling chamber and a pre-compression chamber, wherein the pre-compression chamber is adapted to gather crop material via a rotor and to periodically form a slice of said crop material and introduce the slice towards the baling chamber into a first segment of the baling chamber, the baling chamber comprising a plunger provided for reciprocally moving in the baling chamber thereby compressing slices of crop material into a bale, the baling chamber further comprising at least one movable wall, the agricultural baler further comprising multiple sensors and a controller adapted for controlling operation of the agricultural baler based on inputs of the multiple sensors, wherein a first subset of the multiple sensors is related to a first feature and a second subset of the multiple sensors is related to a second feature, wherein the controller is configured to control the operation of the agricultural baler in a first time period until the first feature is within a first predetermined range, and to control the operation of the agricultural baler in a subsequent time period until the second feature is within a second predetermined range.

The invention is based on the insight that the baler works more effective when the multiple sensors are subdivided into at least two subsets each comprising at least one sensor. The first subset of the multiple sensors is related to a first feature. An example of such a feature is the top fill. The first feature is optimized by the use of the combined measurements of said first subset of the multiple sensors by a controller. This controller is configured to control the operation of the agricultural baler in a first time period. The said first time period typically starts when the baling process is initialized. The baler operating parameters can be adjusted to optimize the first feature so that it lies within a predetermined range. This predetermined range is desirably defined so that the baler operates in an acceptable or optimal condition. More desirably this acceptable or optimal condition is when the quality of bales are sufficient.

When the first feature has been optimized, a second feature can be determined and optimized subsequently. An example of the second feature is the left-right fill. The determination is done in a second time period. This time period begins or starts at a predetermined time. The combined measurements of the second subset of the multiple sensors are related to the second feature. The combined measurements are also used by the controller to adjust the baler operation parameters to optimize the said second feature. In other words, when the first feature lies within the predetermined range, the next feature is optimized to lie within the second predetermined range. This means that one can decide which feature to optimize first, before the next feature is optimized. Therefore one can prioritize a certain feature before another feature.

Adjusting the baler operation parameters to optimize more than one feature of the agricultural baler at once has the effect that the features can be optimized proactively in a predetermined chronological order. The advantage of this being that only one feature is being optimized in a certain time period. The skilled person will realize that this is advantageous over optimizing more than one feature at the same time in a certain time period. It is suboptimal to optimize more than one feature as some parameters will influence more than one feature when it is changed. Therefore adapting the operation parameters in subsequent periods is desirable to adapting them at the same time. This is due to the difficulty of changing parameters affecting more than one feature when adapted.

According to the invention, the controller is adapted to prioritize the first subset of the multiple sensors during the first time period, and to prioritize the second subset of the multiple sensors during the second time period, respectively.

The first group of sensors can be related to the first feature. Therefore this first group of sensors can be prioritized in the first time period. This has the advantage that the sensors related to the first feature are prioritized in the first time period. This means that a subset of the sensors, and not necessarily all of the sensors are used. This is effective for optimizing the first feature in the first time period. The advantage of using only a subset of all sensors is that the optimization can be done faster.

Similarly, the second group of sensors can be related to the second feature. Therefore this second group of sensors can be prioritized in the second time period. This has the advantage that the sensors related to the second feature are prioritized in the first second period. This means that a subset of the sensors, and not necessarily all of the sensors are used. This is effective for optimizing the second feature in the second time period.

According to the invention, the subsequent second time period begins only after the first feature is within the first predetermined range.

The time periods can be divided as such that the time periods do not overlap. This has the advantage that the controller can optimize the first feature first. This optimization is finished when the first feature is within the first predetermined range. The second time period can start when the first feature is within the predetermined range. Thus, the second feature can be optimized by the controller. The second feature is optimized by the second group of sensors. This means that not necessarily all sensors are used to optimize the second feature.

According to the invention, the first time period restarts when the first feature drops out of the first predetermined range.

If the first time period is finished, the second time period can be optimizing the second feature in the second time period. In this second time period the second feature is being optimized. It is possible that during this time period the first feature drops out of the first predetermined range. If this is the case, the first time period is restarted. This means that the first time period starts again. Desirably the second time period is ended when the first time period restarts. This further means that the first feature is again optimized by the first group of multiple sensors. The first time period will again end when the first feature is within the first predetermined range. The advantage of this is that the first feature will be prioritized in the optimization process. This means that the first feature is either in the predetermined range, or being optimized during the first time period. It is advantageous that this happens if, for example, the first feature is more important.

According to the invention, the controller comprises an algorithm for controlling the operation of the agricultural baler.

It is desirable that the controller comprises a means to process the output data of the multiple sensors. Therefore it is advantageous that it comprises an algorithm. This algorithm can control the operation of the agricultural baler.

According to the invention, the first feature and the second feature are chosen as two different ones from:
  top fill;
  left-right fill;
  baling chamber temperature;
  bale weight; and
  bale dimensions.

The first and second feature, when changed, should affect the operation of the baler, in particular the quality of the bales produced. Therefore it is of importance to choose a feature which can changes the quality of the bales being produced. Another type of feature that can be optimized is related to the protection of the agricultural baler. An example of such a type of feature is the baling chamber temperature.

According to the invention, the first feature is the top fill and the second feature is the left-right fill.

The most important or dominant features to improve the quality of the bales produced are the top fill and the left-right fill. Desirably the first feature is the top fill. This is advantageous because the top fill is a feature that has a large effect on the quality of the bales produced. Desirably the second feature is the left-right fill. This is advantageous because the left-right fill is a feature that has a further large effect on the quality of the bales produced.

According to the invention, the first subset comprises at least one of:
  density sensors in pre-baling chamber;
  sensor on stuffer tines;
  straw hook sensors;
  top fill sensors;
  plunger sensors;
  tilting plunger; and
  position sensors on top doors.

The sensors mentioned measure a parameter that is directly or indirectly related to the top fill of the baling chamber. This means that at least one of these aforementioned sensors is to be included in the first subset.

According to the invention, the second subset comprises at least one of:
  density sensors under rotor;
  sensors on rotor tines;
  sensors on segments of the rotor;
  density sensors in pre-baling chamber;
  sensors on the sides of pre-baling chamber;
  current trip sensors;
  sensors on stuffer tines;
  top fill sensors;
  haydogs;
  plunger sensors; and
  position side doors.

The sensors mentioned measure a parameter that is directly or indirectly related to the left-right fill of the baling chamber. This means that at least one of these aforementioned sensors is to be included in the second subset.

According to the invention, the algorithm is adapted to, in a first time period, control at least one of:
  a baler capacity;
  a shape of the pre-compression chamber;
  a tractor speed;
  a PTO-rpm;
  a trajectory followed by one or more tine bars in the pre-compression chamber;
  a rotor scraper angle;
  a rotor speed;
  a change volume of pre-baling chamber;
  a multiple packer/stuffer strokes;
  a number of tines on packer tine bar; and
  a trip setting.

Controlling the aforementioned parameters can change the value or output of the first feature. Therefore it is by changing these parameters that the first feature can be put in the first predetermined range.

According to the invention, said algorithm is adapted to, in a second time period, control parameters concerning the left-right fill, which comprise at least one of:
  a left-right driving over swath;
  a changing vessel speed in PU;
  a blockage in pre-baling chamber to spread crops;
  a change of volume of pre-baling chamber;
  a different pre-baling chamber volume left and right or outer and middle guards;
  a different cylinder pressure on left and right bale room door; and
  a number of tines on packer tine bar.

Controlling the aforementioned parameters can influence the value or output of the left-right fill. Therefore it is by changing these parameters that the second feature can be put in the second predetermined range.

According to the invention, the algorithm comprises factors for outputs of each of the multiple sensors, and wherein the factors relating to the first subset decrease from the first time period to the second time period while the factors relating to the second subset increase from the first time period to the second time period.

The prioritization of the first and second feature can be done by the algorithm. The algorithm can, for example, assign a higher factor to an output of a certain sensor in a certain time period. This means it can assign a higher factor to the output of sensors in the first subset, or a higher factor to the output of sensors in the second subset. The controller can assign a higher factor to the sensors in the first subset during the first time period, and lower the said factor during the second time period. This has the advantage that during the first time period the first subset of sensors is prioritized. This means that the impact of the first set of sensors in the outcome of the algorithm is higher during the first time period.

The same reasoning can be done for the output of sensors in the second subset. The controller can assign a low factor to the sensors in the second subset during the first time period, and raise the said factor during the second time period. This has the advantage that during the second time period the first subset of sensors is prioritized. This means that the impact of the second set of sensors in the outcome of the algorithm is higher during the second time period.

According to the invention, the controller is operationally connected to a memory storing a set of rules for operating the agricultural baler based on outputs of the multiple sensors, wherein multiple rules of the set of rules are assigned to the first feature and further multiple rules of the set of rules are assigned to the second feature.

Storing a set of rules for operating the agricultural baler can be used to optimize the quality of the bales produced. This can be done by storing a set of rules for controlling baler operation based on outputs of the multiple sensors. A first subset of rules can be assigned to the first feature. In other words, some rules of the set of rules are used to optimize the first feature. This subset of rules can be used in the first time period to put the first feature within the first predetermined range. This subset of rules typically primarily uses outputs of the first subset of sensors.

A second subset of rules can be assigned to the second feature. In other words, some rules of the set of rules are used to optimize the second feature. This subset of rules can be used to put the second feature within the second predetermined range. This subset of rules typically primarily uses outputs of the second subset of sensors.

According to the invention, the controller is adapted to use said multiple rules during the first time period and to use said further multiple rules during the second time period.

The multiple rules assigned to the first feature will be used during the first time period. This has the advantage that the first feature is prioritized during the first time period. The multiple rules assigned to the second feature will be used during the second time period. This has the advantage that the second feature is prioritized during the second time period.

According to the invention, parameters related to said controlling operation of the agricultural baler are stored in a parameter memory for future use.

Storing the parameters in a parameter memory has the advantage that during a future initialization of the agricultural baler, parameters are already available. This will shorten the duration of the first and/or second time period. Desirably the stored parameters are updated regularly. More desirably the stored parameters are updated before the end of a baling session. A baling session meaning the time between the start-up and shut-down of the agricultural baler.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Figure 1:
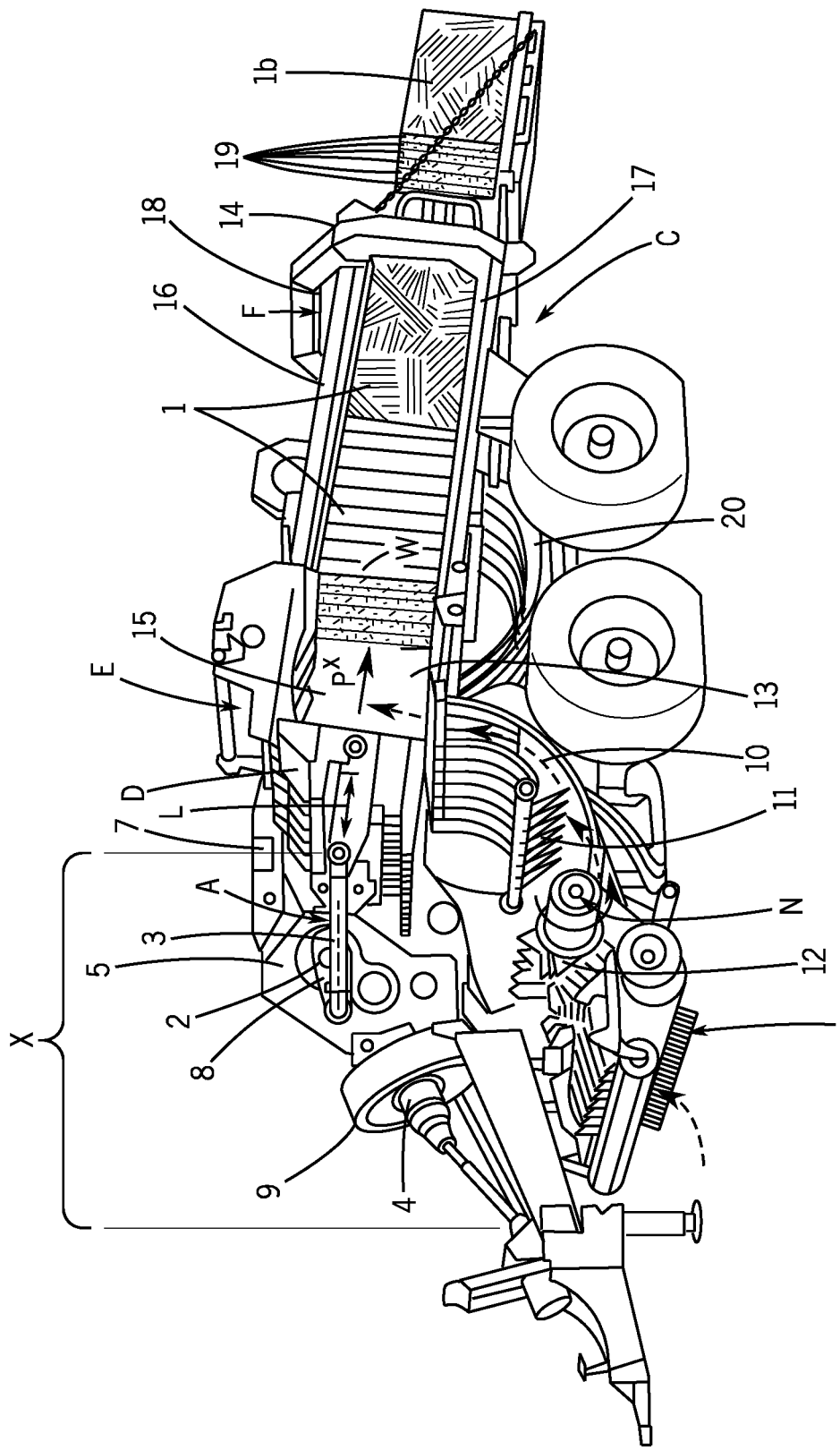
FIG. 1 illustrates a baler according to an embodiment of the invention.

The prior art baling machine or baler shown in FIG. 1 is configured to be pulled over a field and driven by a tractor (not shown). Alternatively, the baler could be self-propelled and/or self-driven.

The baler includes a baling chamber C and a plunger D that can be driven into the baling chamber C in a reciprocating manner. The baling machine also includes a pick up mechanism M for picking up cut bale material such as grass and straw from the ground, a feed mechanism N for feeding the bale material into the baling chamber C and a driveline X for transmitting drive to the plunger D from the drive output of a towing vehicle (not shown). These components are all conventional and are not described in further detail. The baling machine also includes a binding device E for binding the bale with binding twine. This binding device may be any conventional binding device and is therefore not described in further detail.

The baling chamber C comprises an open ended bale-forming channel A through which compressed bale material 1 is forced by the reciprocating plunger D. In this example, the plunger D is driven from a rotating drive axle 2 via a crank 8 and the plunger rod 3. The drive axle 2 comprises an output shaft of a drive gearbox 5 that also has a drive input shaft 4 through which it receives drive from the drive output of a towing vehicle (not shown). The gearbox 5 is mounted on a frame 7 of the baling machine. The drive input shaft carries a large flywheel 9 for smooth operation of the baler.

Typically the material to be baled is taken up from the ground by the pick-up device M. The feed device N feeds the material to an intermediate material buffer 10. The feed device N may be equipped with knives 12 for cutting up the material to be baled. When sufficient material has collected in the intermediate buffer 10, a stuffer 11 forwards the material into the bale chamber C in front of the plunger D. The material is then ready to be compressed.

The open ended channel A that forms the baling chamber C has an inlet end 13 and an outlet end 14. The bale-forming channel A is defined by two side panels 15 (one of which has been omitted in FIG. 1 to show the interior of the baling chamber C), a top panel 16 and a bottom panel 17. The top panel 16 (and/or one or both of the side panels 15) may comprise an adjustable panel that is pivotable about its upstream end allowing the cross-sectional area of the bale-forming channel A to be adjusted. An adjusting mechanism 18 for adjusting the position of the adjustable panel 16 is provided towards the outlet end 14 of the baling chamber C. The adjusting mechanism 18 applies a biasing force F to the adjustable panel 16, to control the level of friction between the panel and the compressed material 1 in the baling chamber C. The adjustable panel 16 thus comprises a friction control element.

The plunger D is driven in a substantially linear direction L in the longitudinal direction of the baling chamber between two end positions comprising respectively a withdrawn position in front of the baling chamber C and an extended position in which it extends into the channel A of the baling chamber C. When the plunger is in the withdrawn position the baling chamber C is loaded with the bale material to be compressed. The plunger D is then driven into the baling chamber so that this new bale material is first shifted into contact with a body of compressed material 1 already in the baling chamber C and then compressed against that body of material. The newly compacted material forms a wad W that is added to the already compacted material 1 in the channel A. The friction of the compressed material 1 with the panels 15, 16, 17 of the baling chamber C provides a resistive force allowing for compression of the new material that is introduced into the baling chamber C in front of the plunger D. Each of the panels 15, 16 and 17 may comprise an adjustable panel allowing the cross-sectional area of the bale-forming channel A to be adjusted. Alternatively, the complete panels 15, 16 and 17 are adjustable and pivotally connected to a baler frame allowing the cross-sectional area of the bale-forming channel A to be adjusted. In both situations, these panels 15, 16 and 17 can be considered as movable walls. Via these movable walls, friction can be controlled.

After compression, continued movement of the plunger D drives the wad W of newly compressed material and the compressed material 1 already in the baling chamber C towards the outlet end 14 of the baling chamber until the plunger D reaches its fully extended end position. The plunger D then returns in the opposite direction to its withdrawn position so that the baling chamber C can be reloaded with new material to be compressed. The plunger therefore performs a compression cycle that consists of a compression stroke followed by a return stroke. This compression cycle is repeated continuously until the baling process is finished.

A bale 1b is formed from the compressed material in the baling chamber and bound with twines 19 that are looped around the body of compressed material in order to hold it in compression after leaving the baling machine. This binding process can be performed as follows.

At the start of the baling process two lengths of twine from spools (not shown) on opposite sides of the baling chamber C are connected to one another by tying the ends of the twines together using the binding device (or knotter) E. As the bale material is compacted in the baling chamber C the spools feed twine to the baling chamber C on either side of the bale material. On one side of the baling chamber C the twine passes through the tip of a baling needle 20. When the body of compressed bale material 1 has reached its full length, between two successive compressing strokes, the needle 20 brings the twine as a loop to the other side of the baling chamber C. The knotter E then knots the twine, joining an end of the twine loop that was brought around the compressed bale by the needle 20 to an end of the twine that was supplied by the spool on other side of the baling chamber (the same side as the knotter device E). The needle 20 is then retracted and a new bale is started.

Multiple sensors are distributed through the agricultural baler to control different aspects of the operation of the baler. In the end, since the baler produces bales, all operating parameters relate to the bale making process in one or another way. However, some sensors directly measure bale parameters while other sensors measure aspects indirectly relating to the bale characteristics. Examples are given hereunder of multiple sensors, which are merely given for better understanding of the present invention. The sensors mentioned are not exhaustive and are therefore not limiting for the invention.

The front end of the intermediate material buffer 10 typically comprises a rotor for picking up the swath of crop material from the field. This rotor can be provided with sensors, for example speed and/or torque sensors that give an indication on the amount of swath that is picked up from the field. It will be clear for the skilled person that this sensor output can be related to bale characteristics, such as top fill or left-right fill. This sensor output could be taken in combination with other sensor outputs to control aspects of the baling process.

Sensors can be provided at sides of the pre-compression chamber 10. These sensors can detect the presence and/or density of crop material in the pre-baling chamber 10. Based on the output of these sensors, the stuffer can be controlled. The skilled person will understand that output of these sensors in the sides of the pre-compression chamber 10 can relate to bale characteristics, such as top fill and/or left-right fill. These sensors are used to control aspects of the baling process. These sensors can therefore be appointed to either the first subset of sensors, or the second subset of sensors, or both subsets of sensors. The sensors at the sides of the pre-compression chamber relate to crop material presence sensors, or can relate to position sensors of side elements of the pre-compression chamber 10. The sensors at the sides of the pre-compression chamber can be appointed to the second subset of sensors, related to the left-right fill.

At the pre-compression chamber 10, straw hook sensors can be provided. Straw hook sensors can provide an indication of the top fill and/or left-right fill. Therefore, the skilled person will be able to control the operation of the agricultural baler based on an output of the sensors. However, it will be clear that these sensors can be appointed to either the first subset of sensors, or the second subset of sensors, or both subsets of sensors.

The top wall of the inlet end 13 of the baling chamber, and optionally also the side walls are provided with multiple sensors. These sensors measure the presence of crop material in this inlet end when the stuffer stuffs the pre-compressed crop material into the baling chamber. These sensors can be mechanic sensors, optic sensors, ultrasonic sensors. These sensors can measure the presence of crop material, but also the timing at which crop material arrives so that an indication of top fill and/or left-right fill can be obtained. These sensors can be used to optimize the operation of the agricultural baler. Therefore, these sensors can be appointed to either the first subset of sensors, or the second subset of sensors, or both subsets of sensors.

The plunger D can be provided with multiple sensors to measure the pressure exerted by the plunger to the crop material. Outputs of these sensors relate to the density of the agricultural baler and however, environmental and operational settings could influence optimal outputs of these plunger sensors. The outputs of these sensors give an indication of top fill and/or left-right fill, and can therefore be appointed to either the first subset of sensors, or the second subset of sensors, or both subsets of sensors. Plunger sensors could comprise sensors in the surface of the plunger facing the baling chamber, wherein multiple sensors measure the pressure applied to the crop material. Furthermore, plunger sensors can be provided in the plunger drive mechanism, plunger tilt could be measured.

The baling chamber comprises one or multiple moveable walls, for example the side panels 15 and the top panel 16. These moveable walls can be provided with sensors. One of the sensors is typically a position sensor wherein the position of the top wall and the position of the side walls is measured. The position of the top wall directly relates to the height of the bale while the position of the side walls directly relates to the width of the bale. These sensors are typically provided at a rear segment of the baling chamber.

Figure 2:
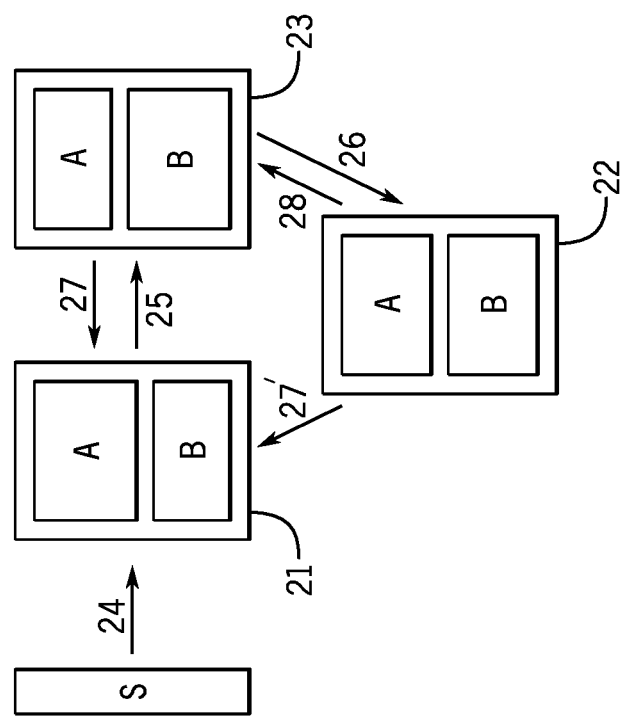
FIG. 2 shows a scheme for controlling a baler according to an embodiment of the invention.

FIG. 2 shows a scheme for operating the baler. In the figure, the baler goes from a stand still into the first time period. This is shown by arrow 24. In the figure, the controller 21 illustrates the controller in a first time period. The figure shows a large and a small field, relating to the first subset of sensors A and the second subset of sensors B respectively. In this state of the controller 21, the controller prioritizes the first subset of sensors A when controlling the baler. The second subset of sensors B can also be used to control the baler in the first time period; however the importance of the first subset A is higher. The first subset of sensors A is related to the first feature. The second subset of sensors B is related to the second feature. The subsets of sensors can be overlapping, as is clear from above.

FIG. 2 shows that if it is determined that the characteristics of the first feature comply with the predetermined settings, the controller 23 is used to control the baler. In other words, if the first feature is within the predetermined range, the controller 23 is used to control the baler. This is shown by arrow 25. In practice, the controller 23 and the controller 21 can be the same element, but with different settings. To illustrate the difference, FIG. 2 shows two controllers 21 and 23. Controller 21 relates to the first time period and controller 23 relates to the second time period. The controller 23 also shows a large and a small field, relating to the second subset of sensors B and the first subset of sensors A, respectively. This is the other way around compared to controller 21. Hence the skilled person will realize that the second subset of sensors B is given a higher weight or priority in the controlling of the baler.

FIG. 2 further shows that if it is determined that the characteristics of the second feature comply with the predetermined settings, the controller 22 is used to control the baler. In other words, if the first feature is within the predetermined range, the controller 22 is used to control the baler. This is shown by arrow 26. Similarly to before, the controller 22 can be the same element, but with different settings. Therefore, the controllers 21, 22, 23 can be the same element, but with different settings. This is illustrated in FIG. 2 by showing three different controllers 21, 22, 23. Controller 21 is in the first time period and controller 23 is in the second time period, while controller 22 is used when it is in neither the first nor the second time period.

The first time period restarts when the first feature drops out of the predetermined range. This is shown by arrows 27 and 27'. Similarly, if the baler is currently being controlled by the controller 22, the second time period could restart when the second feature drops out of the predetermined range. This is shown by arrow 28.

A parameter database or parameter memory (not shown) is operationally connected to the controller. This memory can be physically the same or different from the memory storing the set of rules. This memory stores values or ranges related to the first and second subset of sensors A,B. These values or ranges are called operating parameters or ranges of operating parameters. These values or ranges are desirably recorded or stored in the memory only after it is determined that the first and second feature lay within a predetermined range. More desirably it is possible to store the operating parameters relating to the first subset of sensors A when the first feature lays within a predetermined range, while it is also possible to store the operating parameters relating to the second subset of sensors B when the second feature lays within a predetermined range.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. An agricultural baler comprising:
a baling chamber;
multiple sensors, some of which are operably coupled to the baling chamber; and
a pre-compression chamber configured to gather crop material via a rotor and to periodically form a slice of said crop material and introduce the slice towards the baling chamber into a first segment of the baling chamber,
wherein the baling chamber comprises a plunger provided for reciprocally moving in the baling chamber thereby compressing slices of crop material into a bale,
wherein the baling chamber further comprises at least one movable wall,
wherein the baling chamber further comprises a controller configured for controlling operation of the agricultural baler based on inputs of the multiple sensors,
wherein a first subset of the multiple sensors is related to a first feature and a second subset of the multiple sensors is related to a second feature,
wherein the controller is configured to control the operation of the agricultural baler in a first time period until the first feature is within a first predetermined range, and to control the operation of the agricultural baler in a second time period, until the second feature is within a second predetermined range, the second time period ending if the first feature is no longer in the first predetermined range and the first time period is restarted, the second time period also ending when both the first feature is in the first predetermined range and the second feature is in the second predetermined range, the second time period restarting only when the first feature is in the first predetermined range and the second feature is no longer in the second predetermined range,
wherein the controller is adapted to prioritize the first subset of the multiple sensors during the first time period, and to prioritize the second subset of the multiple sensors during the second time period, respectively.

2. The agricultural baler of claim 1, wherein the controller comprises an algorithm for controlling the operation of the agricultural baler.

3. The agricultural baler of claim 1, wherein the first feature and the second feature are chosen as two different ones from:
top fill;
left-right fill;
baling chamber temperature;
bale weight; and
bale dimensions.

4. The agricultural baler of claim 3, wherein the first feature is the top fill and the second feature is the left-right fill.

5. The agricultural baler of claim 4, wherein the first subset comprises at least one of:
density sensors in the pre-compression chamber;
stuffer tines having a sensor;
straw hook sensors;
top fill sensors;
plunger sensors; and
wherein the plunger is operable to tilt.

6. The agricultural baler of claim 4, wherein the second subset comprises at least one of:
density sensors under the rotor;
rotor tines having sensors;
sensors on segments of the rotor;
density sensors in the pre- compression chamber;
sensors on the sides of the pre- compression chamber;
current trip sensors;
stuffer tines having sensors;
top fill sensors;
haydogs;
plunger sensors; and
position side panel sensors.

7. The agricultural baler of claim 2, wherein the algorithm is configured to, in the first time period, control parameters concerning a top fill, which comprise at least one of:
a baler capacity;
a shape of the pre-compression chamber;
a PTO-rpm;
a trajectory followed by one or more tine bars in the pre-compression chamber;
a rotor scraper angle;
a rotor speed;
a change volume of the pre-compression chamber; and
a trip setting.

8. The agricultural baler of claim 2, wherein the algorithm is adapted to, in the second time period, control parameters concerning a left-right fill, which comprise at least one of:
a left-right driving over swath;
a blockage in the pre-compression chamber to spread crops; and
a change of volume of the pre-compression chamber.

9. The agricultural baler of claim 1, wherein an algorithm comprises factors for outputs of each of the multiple sensors, and wherein the factors relating to the first subset decrease from the first time period to the second time period while the factors relating to the second subset increase from the first time period to the second time period.

10. The agricultural baler of claim 1, wherein the controller is operationally connected to a memory storing a set of rules for operating the agricultural baler based on outputs of the multiple sensors, wherein multiple rules of the set of rules are assigned to the first feature and further multiple rules of the set of rules are assigned to the second feature.

11. The agricultural baler of claim 10, wherein the controller is configured to use said multiple rules during the first time period and to use said further multiple rules during the second time period.

12. The agricultural baler of claim 1, wherein operating parameters related to said controlling operation of the agricultural baler are stored in a parameter memory for future use.

* * * * *